June 26, 1934.   V. E. ROYLE   1,964,600
EXTRUDING MACHINE
Filed Dec. 15, 1932
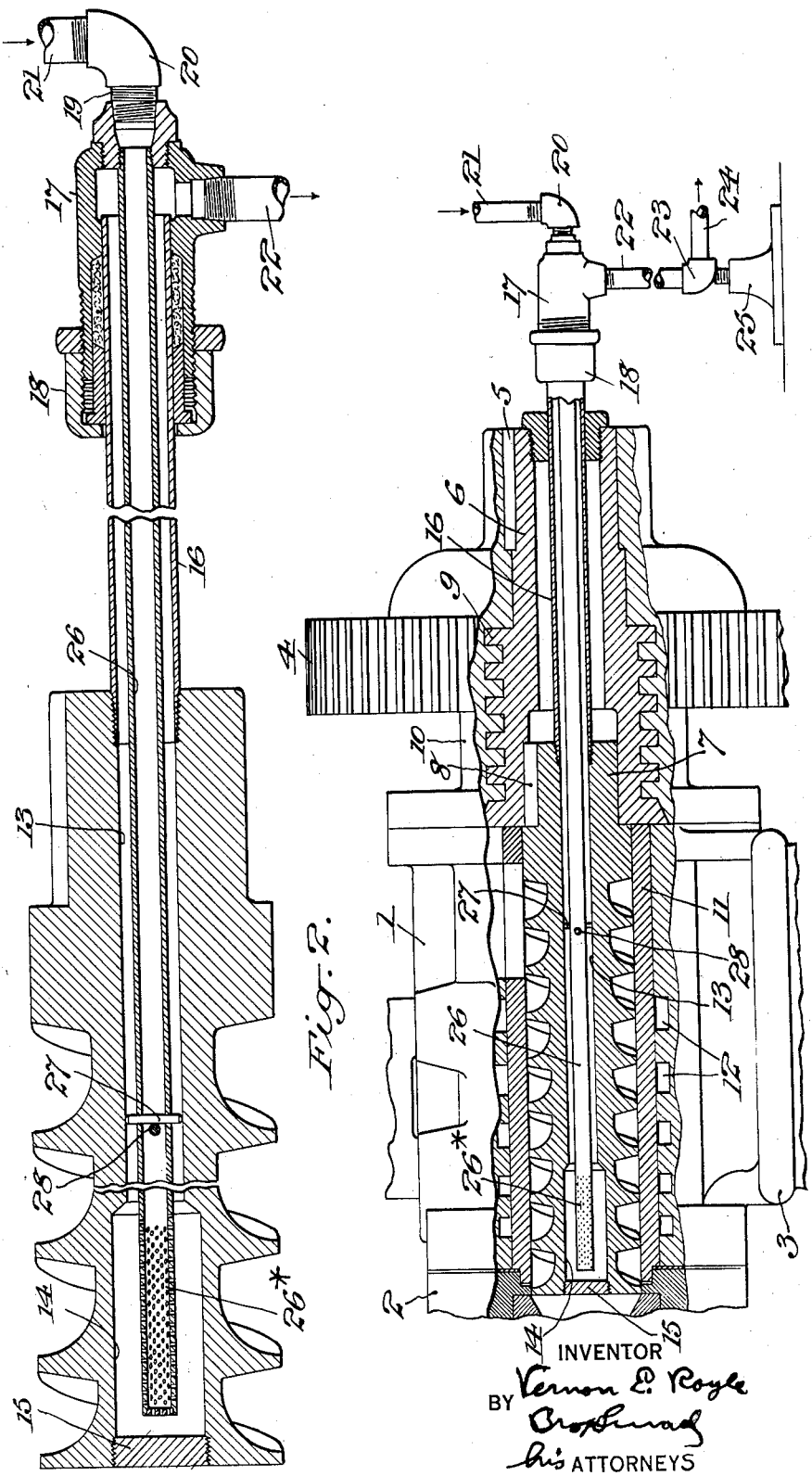
INVENTOR
Vernon E. Royle
BY
his ATTORNEYS Patented June 26, 1934

1,964,600

UNITED STATES PATENT OFFICE 1,964,600

EXTRUDING MACHINE

Vernon E. Royle, Paterson, N. J.

Application December 15, 1932, Serial No. 647,359

8 Claims. (Cl. 18—12)

This invention relates to an improvement in extruding machines and, more particularly, in the stock screw or plodder therefor.

The invention has for an object to provide a screw which embodies means for controlling its temperature and, particularly, for preventing overheating thereof.

Another object consists in providing a screw which is chambered and provided with means within the chamber for regulating its temperature.

Another object consists in providing a screw the temperature of which is adapted to be controlled by the action of a fluid therewithin, and which includes means for exhausting the fluid after it has served its purpose.

Another object consists in providing a screw which includes means for effectively controlling its temperature without altering its general exterior form, construction or adaptability.

A further object consists in providing certain improvements in the form, construction and arrangement of the several parts, whereby the above named and other objects may effectively be attained.

A practical embodiment of the invention is represented in the accompanying drawing, in which Fig. 1 represents a broken longitudinal section of the screw and appurtenant parts, and Fig. 2 represents a detail elevation, partly in section, and on a reduced scale, showing the screw arranged in a tubing machine cylinder and adjacent parts.

The tubing machine cylinder, which may be of any well known or approved form, is denoted generally by 1 and the head therefor, which also may be of any suitable form, is marked 2. The cylinder is conventionally mounted on an upright or standard 3. The main gear is marked 4, and it is connected in a well understood manner through the key or spline 5 with a shank 6 that is fixed to the screw 7 by a key 8. The shank 6 has a plurality of flanges 9 that enter corresponding recesses in the housing 10 and form a thrust bearing for the screw 7.

The exterior form of the screw may be as usual and it is mounted to turn in a liner 11 fitted in the cylinder 1, which liner is surrounded by channels 12 for the circulation of a temperature controlling medium. The parts which have thus far been described are well understood by those familiar with this industry, both as to construction and mode of operation, so that further description is regarded as unnecessary.

The screw 7 is fashioned with a central bore 13 which is enlarged toward the forward end to constitute a chamber 14, the front end of which is closed by a plug 15 that is threaded into the screw.

A sleeve 16 has one end threaded into the rear end of the screw and its other end fitted into a T-head 17, which fit is made leak-tight by a stuffing box that is denoted generally by 18.

One side of the T-head is provided with a nipple 19 that is connected by means of an elbow 20 with a pipe 21 which leads from a suitable source of supply of temperature controlling fluid under pressure such, for instance, as cold water; the source of supply not being shown.

The lower outlet of the T-head has a pipe 22 threaded therein, which pipe leads, through elbow 23 and pipe 24, to suitable suction mechanism, such as an exhaust pump, not shown. These parts may be supported by a standard 25.

A tube 26 is located within and in spaced relationship to the bore 13 of the screw and within sleeve 16 and T-head 17. One extremity of the tube is threaded into the T-head in abutment with nipple 19 while the other extremity projects into chamber 14 within the forward end of the screw. A pair of pins 27, 28, with suitably rounded ends, are fitted into and project from the tube 26 so as to contact with the wall of bore 13 and thereby provide a bearing support for the forward end of the tube.

The front end of the tube is foraminous, as indicated at 26*, being provided with a multiplicity of apertures in its circumference and in its end wall.

In operation, the stock screw or plodder 7 will be rotated in the usual way by the main gear 4, which is connected by gearing not shown with a source of power not shown, the rotation of the screw serving to extrude stock through the head of the machine in a well understood manner. This action generates a great deal of friction and heat which tends to elevate the temperature of the screw to an undesirable degree. In the course of the operation, a suitable temperature controlling fluid, such as cold water under pressure, may be forced into pipe 21 and thence through tube 26 from the perforated end of which it will be sprayed against the interior of the forward end of the screw, thus serving greatly to restrain the generation of excessive temperature therein. The fluid which has been sprayed into the chamber 14 and against the interior of the screw may be withdrawn by the suction created through the pipe 22 which reaches the chamber 14 by way of the annular channel that exists owing to the spaced relationship of the tube 26 within bore 13 and sleeve 16. The suction should be sufficient to maintain a partial vacuum in the chamber 14 so as to facilitate the spraying of the medium from the perforated end of the tube. If this were not so, there would be a tendency for the liquid to fill the chamber and prevent the desirable spraying action. It will, of course, be apparent that any suitable form of temperature controlling fluid may be employed and that the temperature of the fluid itself, prior to injection, may be regulated to suit the demands of the occasion.

The fact that the sleeve 16 is mounted in the stuffing box 18 enables it freely to turn with the screw 7, while the stuffing box prevents leakage of the fluid.

It will be understood that various changes may be resorted to in the form, construction and arrangement of the several parts without departing from the spirit and scope of my invention; and hence I do not intend to be limited to the details herein shown and described, except as they may be included in the claims.

What I claim is:—

1. A stock screw for extruding machines provided with an internal bore closed at the forward end thereof, a tube located in said bore and spaced from the closed end and wall of the bore, said tube having a foraminous end and end wall within said bore, means for injecting a temperature controlling medium through said tube and end wall, and means for withdrawing said medium from around said tube.

2. A stock screw for extruding machines provided with an internal bore, said bore being developed into an enlarged closed ended chamber near the forward end of the screw, a tube having an end wall and located in said bore, means on the tube for spacing it from the wall of the bore, said tube having its forward end located within said chamber and provided with a multiplicity of apertures in its circumference and end wall, means for injecting a temperature controlling medium through said tube and apertures into said chamber, and means for withdrawing said medium from said chamber and around said tube.

3. In an extruding machine, a stock screw provided with an internal bore, said bore being developed into an enlarged closed ended chamber near the forward end of the screw, a source of supply of a temperature controlling medium, a suction means, and a pair of conduits arranged one within the other and having means for maintaining them in spaced relation to each other, one of said conduits connecting said source of supply with said chamber and the other conduit connecting said suction means with said chamber through said bore.

4. In an extruding machine, a stock screw provided with an internal bore, said bore being developed into an enlarged closed ended chamber near the forward end of the screw, a source of supply of a temperature controlling medium, a suction means, and a pair of conduits arranged one within the other and having means for maintaining them in spaced relation to each other, one of said conduits connecting said source of supply with said chamber and the other conduit connecting said suction means with said chamber through said bore, one of said conduits being fixed and the other being rotatable with the screw.

5. In an extruding machine, a stock screw provided with an internal bore, said bore being developed into an enlarged closed ended chamber near the forward end of the screw, a source of supply of a temperature controlling medium, a suction means, and a pair of conduits arranged one within the other and having means for maintaining them in spaced relation to each other, one of said conduits connecting said source of supply with said chamber and the other conduit connecting said suction means with said chamber through said bore, the inner conduit being fixed and the outer conduit being rotatable with the screw.

6. In an extruding machine, a stock screw provided with an internal bore, said bore being developed into an enlarged closed ended chamber near the forward end of the screw, a chambered T-head provided with three ports, a source of supply of temperature controlling medium connected to one of said ports, a suction means connected to another of said ports, and means connecting the third port with the bore and chamber in the screw, said last named means opening communication between said bore and said source of supply and suction means.

7. In an extruding machine, a stock screw provided with an internal bore, said bore being developed into an enlarged closed ended chamber near the forward end of the screw, a chambered T-head provided with three ports, a source of supply of temperature controlling medium connected to one of said ports, a suction means connected to another of said ports, and a pair of conduits connecting the third port with the bore in the screw, said conduits opening communication between said bore and chamber and said source of supply and suction means, and a stuffing box carried by said T-head and fitted to receive one end of a said conduit to enable it to rotate with the screw without leakage of said medium.

8. In an extruding machine, a stock screw provided with an internal bore, said bore being developed into an enlarged closed ended chamber near the forward end of the screw, a chambered T-head provided with three ports, a source of supply of temperature controlling medium connected to one of said ports, a suction means connected to another of said ports, and a pair of conduits arranged one within the other and having means for maintaining them in spaced relation to each other, said conduits opening communication between said bore and chamber and said source of supply and suction means, and a stuffing box carried by said T-head and fitted to receive one end of the outer conduit to enable it to rotate with the screw without leakage of said medium.

VERNON E. ROYLE.

CERTIFICATE OF CORRECTION.

Patent No. 1,964,600. June 26, 1934.

VERNON E. ROYLE.

It is hereby certified that error appears in the printed specification of the above numbered patent requiring correction as follows: Page 2, lines 108 and 118, claims 6 and 7, respectively, after "bore" insert the chamber; and that the said Letters Patent should be read with these corrections therein that the same may conform to the record of the case in the Patent Office.

Signed and sealed this 7th day of August, A. D. 1934.

Leslie Frazer (Seal) Acting Commissioner of Patents.